May 25, 1965 J. F. KLEIN 3,184,954
GAS ANALYZING SYSTEMS
Filed April 17, 1961 6 Sheets-Sheet 1

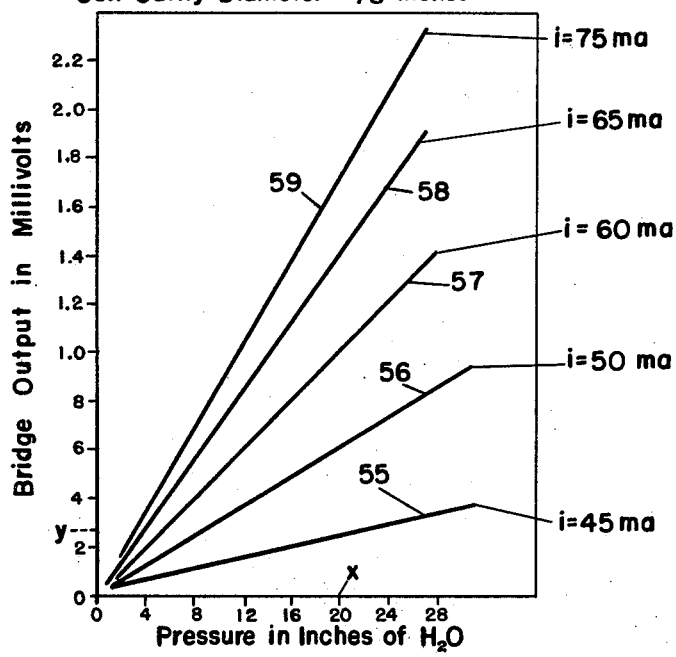
Fig. 4 — Plain Convection Cell (no magnetic field)
Gas-Air
Ambient Temperature 75°F–80°F
Cell Cavity Diameter = 3/8" inches
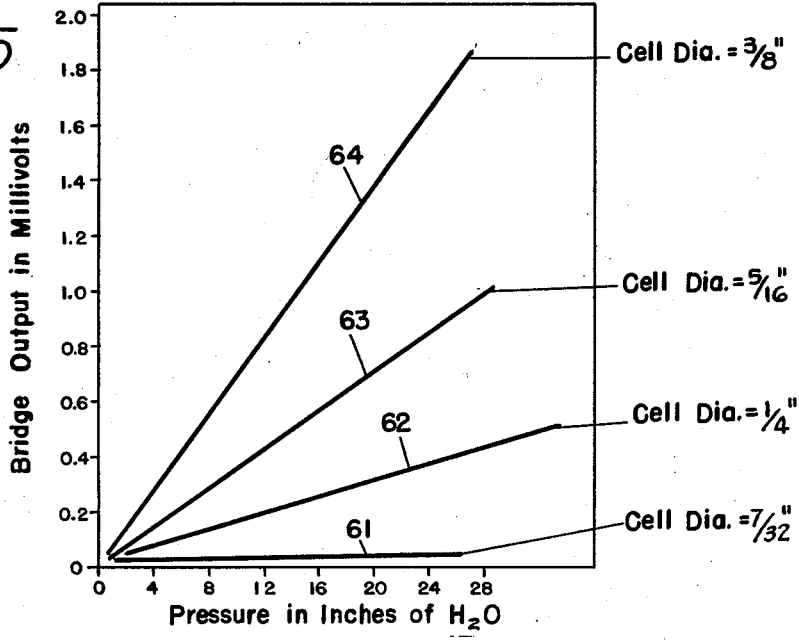
Fig. 5 — Plain Convection Cell (no magnetic field)
Gas Air
Ambient Temperature 75°F–80°F
Current Through Cell Resistor = 65 ma May 25, 1965     J. F. KLEIN     3,184,954

GAS ANALYZING SYSTEMS

Filed April 17, 1961     6 Sheets-Sheet 4

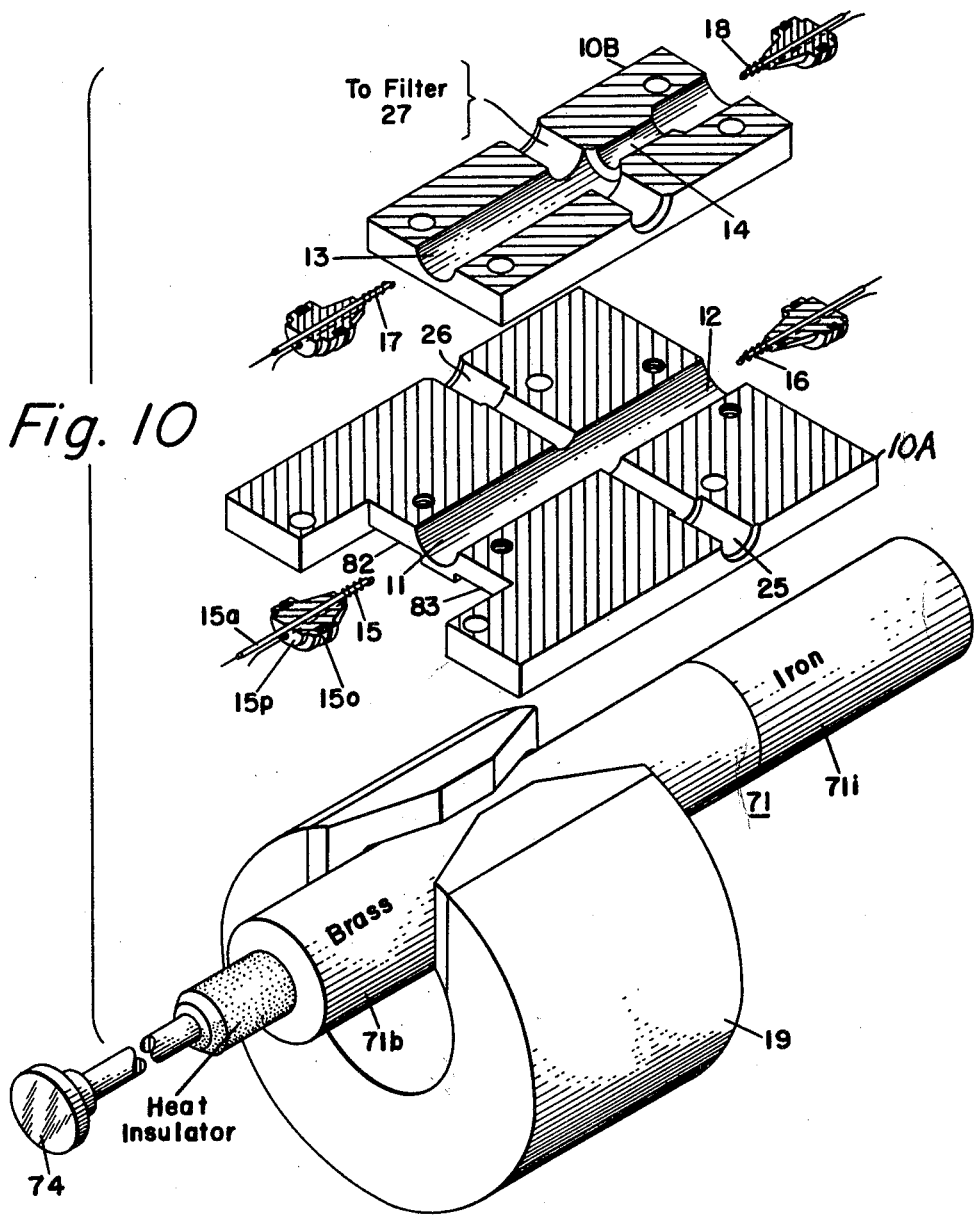

United States Patent Office 3,184,954
Patented May 25, 1965

3,184,954
GAS ANALYZING SYSTEMS
Joseph F. Klein, Philadelphia, Pa., assignor to Leeds and Northrup Company, Philadelphia, Pa., a corporation of Pennsylvania
Filed Apr. 17, 1961, Ser. No. 103,354
14 Claims. (Cl. 73—27)

This invention relates to gas analyzers of the type for determining the concentration in a sample stream of a component having a temperature coefficient of magnetic susceptibility and has for an object the provision of a simple, rugged, reliable system easy to calibrate and in which the concentration measurement will be substantially independent of change in ambient pressure.

As explained in Foley and Cherry Patent 2,603,964, the accurate measurement of the oxygen content of various gases used in, or produced by, industrial processes is important to many industries. In systems where gases, having paramagnetic properties, flow through measuring cells, it is important to maintain constant the operating conditions or to provide compensatory arrangements in the event of change of conditions during measurement. If the ambient pressure changes, the output of the measuring cell will change and thus error will appear in the measurement.

It is an object of the present invention to provide an arrangement in which the effects of ambient pressure changes have been almost eliminated, at least reduced in magnitude to a negligible value, by an arrangement which is automatic in its operation and which requires a minimum of manipulative acts on the part of the operator.

It is a further object of the invention to provide means whereby the gas analyzer may be readily calibrated, as by shifting from a measuring cell the magnetic flux so that in a balanceable bridge circuit the measuring cell and the reference cell will equally respond to a sample gas stream including a paramagnetic gas.

In carrying out the invention in one form thereof, there is provided in a balanceable network, as a Wheatstone bridge, not only a measuring cell including a source of high intensity magnetic flux and a reference cell but also a compensating cell and an associated reference cell for eliminating from the output of the bridge changes in the response of the measuring cell due solely to changes in the ambient pressure on that cell. More particularly the second reference cell including a temperature-sensitive resistor has a construction which resists change in the resistance with change of ambient pressure while the construction of the compensating cell together with a magnitude of the current through its temperature-sensitive resistor produce an output from the bridge which eliminates therefrom the effects of ambient pressure changes on the measuring cell. For a given cell structure the magnitude of the correcting function may be adjusted by maintaining different magnitudes of current through one branch of the bridge compared with the current through the other branch of the bridge. Similar changes in the magnitude of the correcting function may likewise be attained for a given magnitude of current by varying the extent of the free space surrounding a resistor and thus the magnitudes of convection currents developed in the region of the temperature-sensitive resistors located respectively in the compensating cell and in its associated reference cell.

For further objects and advantages of the invention and for additional features of novelty, reference is to be had to the following description taken in conjunction with the accompanying drawings, in which:

FIG. 1 diagrammatically illustrates one form of the invention;

FIGS. 2–5 are graphs explanatory of the operation of the invention;

FIG. 10 is an exploded view of important parts of the cell-and-magnet assembly.

Figure 1:
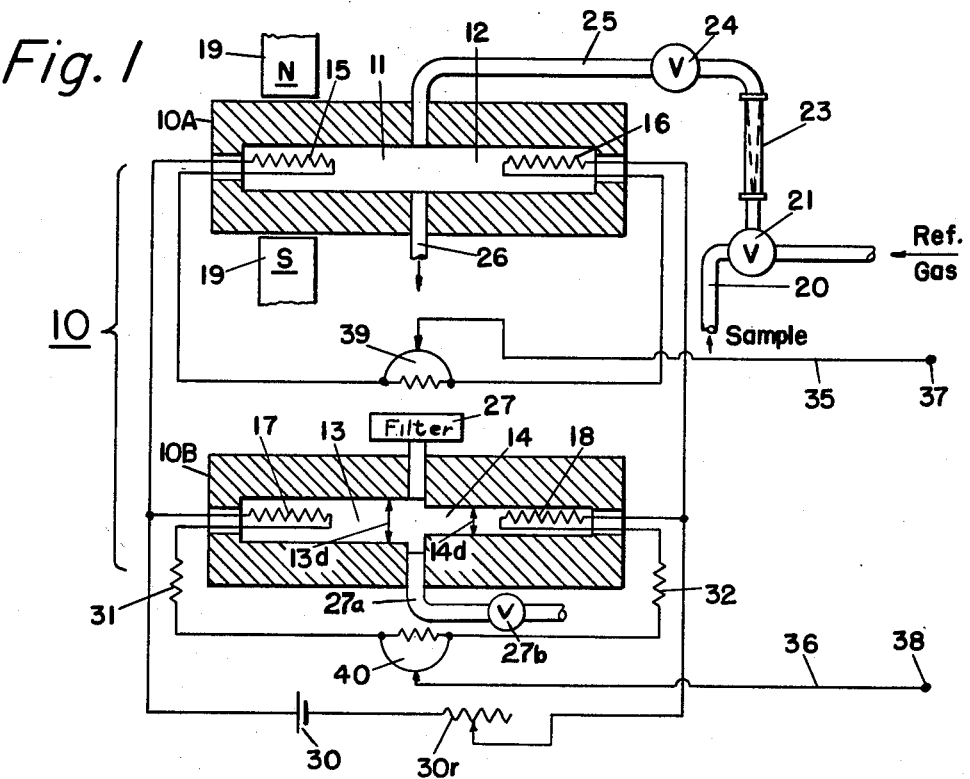
FIG. 1A is a wiring diagram of the arrangement of FIG. 1 with additional features incorporated therein.

Referring to FIG. 1, the invention has been schematically shown in one form as applied to a gas analyzer cell assembly 10 comprising a measuring cell 11 having disposed therein a temperature-sensitive resistor 15. To produce within at least a peripheral portion of the measuring cell 11 a strong magnetic field, there is provided a permanent magnet 19 having suitably shaped pole pieces later to be described. In flow communication with the cell 11 is a reference cell 12 having therein a temperature-sensitive resistor 16. The analyzer 10 further includes a compensating cell 13 in flow communication with a fourth cell 14, these cells respectively including temperature-sensitive resistors 17 and 18. It is to be noted that for reasons later set forth the diameter 13d of the cell 13 is larger than the diameter 14d of cell 14.

A stream of sample gas is supplied through a supply line 20 and is admitted by way of a two-way valve 21 to a flow meter 23 which by means of a regulating valve 24 provides a predetermined flow of gas through inlet line 25 to the cells 11 and 12. The sample stream diffuses outwardly into the two cells and discharges from the cells by way of a line 26 which may be vented to atmosphere. The cells 13 and 14 are connected to atmosphere by way of a filter 27. Accordingly, all four of cells 11–14 are connected to atmosphere and the pressure in each cell varies with the ambient pressure; i.e., with atmospheric pressure. A pipe 27a in normal operation is closed by a valve 27b. The resistors 15–18, all alike in size and composition, are connected into a measuring circuit 28 of the Wheatstone bridge type best shown in FIG. 1A. The bridge is energized from a suitable, regulated, constant-voltage source of supply, shown as a battery 30. The measuring resistor 15 forms one arm of the bridge and the reference resistor 16 a second arm of the bridge. A third arm of the bridge (adjacent the arm including the measuring resistor 15) includes resistor 17 and an additional resistor 31. Similarly, the remaining arm of the bridge including resistor 18 also includes an additional resistor 32. The resistors 31 and 32 are current-determining resistors with values selected to predetermine the current through the two arms including resistors 17 and 18 and to make that current differ from the current through the arms including the resistors 15 and 16. Output conductors 35 and 36 are in FIG. 1 shown connected to output terminals 37 and 38. The output conductor 35 is connected to the adjustable contact of a potentiometer 39 including resistors 39a and 39b, while the output conductor 36 is connected to the adjustable contact of a second potentiometer 40 including resistors 40a and 40b. The latter potentiometer is provided for fine adjustments, while the potentiometer 39 is provided for coarse adjustments for purposes of calibrating the bridge.

As well understood by those skilled in the art and as fully explained in Foley and Cherry Patent 2,603,964, the presence of a paramagnetic gaseous component in the sample stream supplied through inlet line 25 will, under the influence of the strong magnetic field provided by the magnet 19, develop thermal magnetic convection currents in cell 11 together with the convection currents produced by heat alone. These convection currents produce a cooling of resistor 15 exceeding the cooling of resistor 16 produced by the purely thermal convection currents in cell 12 which does not have associated with it a source of magnetic flux. Accordingly, the resistance of temperature-sensitive resistor 15 varies in proportion to the content of the paramagnetic constituent of the gaseous stream and produces a bridge unbalance proportional thereto. The foregoing result is achieved by reason of the presence of the reference cell 12 with its resistor 16 connected in the bridge network. The reference resistor 16 and cell 12 are structurally like resistor 15 and cell 11. Therefore, resistor 16 responds identically with the temperature-sensitive measuring resistor 15 with changes in ambient temperature of the cell; also resistors 15 and 16 respond alike to changes in the specific heat and viscosity of the sample stream and to other variables. However, the resistance of the measuring resistor 15 additionally changes in proportion to the quantity of paramagnetic gas within the sample stream, while the resistor 16 does not respond thereto.

In accordance with the present invention, it has been found that the output voltage of the bridge 28, if not properly compensated, includes a component due to ambient pressure changes, which results in an erroneous indication of the amount of paramagnetic gas present in the sample stream. This error component changes as a linear function of the quantity of paramagnetic gas in the sample stream diffusing into the cells 11 and 12. In order to compensate for such ambient pressure changes, the temperature-sensitive resistors 17 and 18 have been provided. They are disposed within cells 13 and 14 which differently perform. More particularly, in the modification illustrated, FIGS. 1 and 10, the diameter 13d of the cell 13 is large compared with the diameter 14d of cell 14. Stated differently, the free space about the resistor 17 provides a volume adequate for the development of thermal convection currents which change in magnitude with change in pressure, whereas the resistor 18 is disposed within a cell in which there is lacking sufficient space for convection currents of consequential magnitude. Alternatively, the resistor 18 may be mounted in a sealed cell in which no pressure changes can occur. On the other hand, it has been found that if the cell cavity of cell 14 has no more free space about the resistor 18 (spirally wound to a diameter of about 0.023") than provided with a bore opening of about $7/32$ inch in diameter, the resistor 18 will be immune to variable cooling due to a changing ambient pressure. As the diameter of cell 13 increases from about $7/32$ inch, the temperature-sensitive resistor 17 will vary more and more with change in ambient pressure. As will later be made clear, adequate sensitivity of resistor 17 to pressure changes to provide compensation for the measuring branch of the bridge 28 has ben attained with a diameter of cell 13 of the order of $3/8$ inch.

Figure 2:
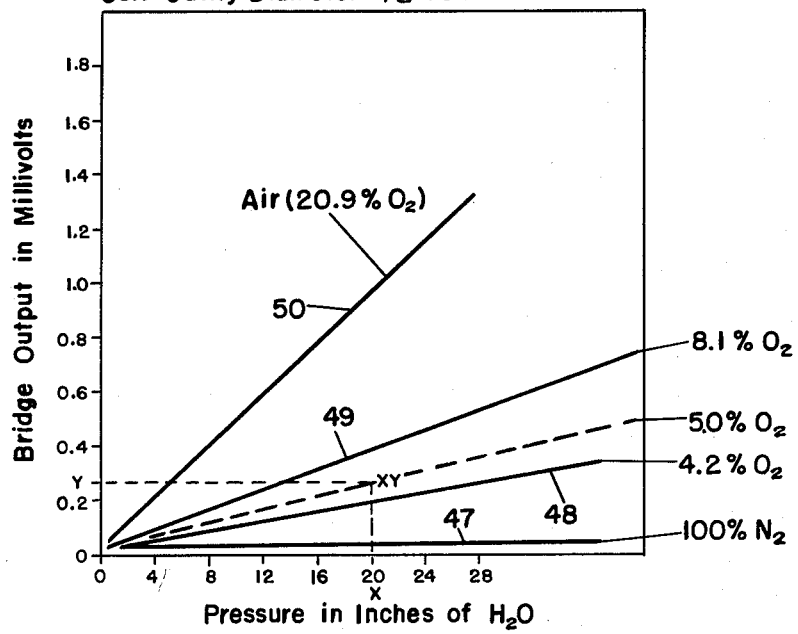

The foregoing will be beter understood by reference to the data appearing in graph form in FIGS. 2 to 5 and the manner in which that data is utilized to assure compensation for pressure changes so as to minimize their effects upon the output of the measuring bridge. Referring now to FIG. 2 the curves 47, 48, 49 and 50 have been plotted with change in ambient pressure as abscissae and bridge output in millivolts as ordinates. The curve or graph 48 shows the increase in output of an uncompensated bridge due solely to increase in pressure when a $3/8$" diameter cell disposed in a magnetic field has a current of 65 milliamperes flowing through its resistor and the stream of sample gas in the cell has an oxygen content of 4.2%. Graph 49 shows the output when the stream contains 8.1% oxygen; and graph 50, the output when the sample stream is air and thus contains about 20.9% oxygen. The curve or graph 50 indicates that a greater change in output will occur with the larger amount of oxygen in the sample stream, and that as this oxygen decreases to zero, as in the case of the lowermost graph 47, where the sample stream comprised only nitrogen, which is not paramagnetic, there will be no change in output of the bridge. This is so since there will then be absent in the measuring cell any paramagnetic component.

Figure 3:
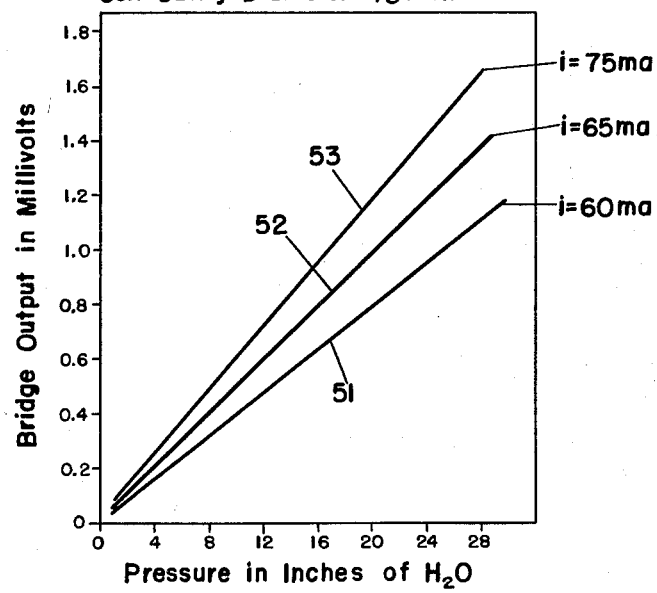

Referring now to FIG. 3, the graphs or curves 51, 52 and 53 have been plotted for air with the same variables as abscissae and ordinates as in the case of FIG. 2. However, for these curves the oxygen content of the cell was held constant and the current through the cell varied. For the curve 51, the current traversing the temperature-sensitive resistor 15 was 60 milliamperes; for the curve 52, 65 milliamperes; and for the curve 53, 75 milliamperes. The increased pressure sensitivity with increasing current through the temperature-sensitive resistor 15 is well shown by these three curves. The conclusions to be drawn from FIGS. 2 and 3 are that the output of the bridge 28 will vary with pressure dependent upon the amount of oxygen present in cell 11 and that the output from the bridge 28 due to pressure changes is also dependent upon the current through the resistor 15.

Referring now to FIG. 4 it will be seen that when other parameters are maintained constant, changing the current through the temperature-sensitive resistor 17 in its $3/8$" diameter cell will alter the bridge output due to pressure change on the gas in cell 13. In FIG. 4 the graphs or curves 55–59 respectively are plotted with "Pressure" as abscissae and "Bridge output in millivolts" as ordinates (the same as in FIGS. 2 and 3). These curves show that with different currents through the temperature-sensitive resistor 17 of the compensating cell 13 the amount of change in the output from the bridge 28 will be different. Thus, for the lowermost curve 55, the current through the resistor 17 was 45 milliamperes; for the curve 56, 50 milliamperes; for the curve 57, 60 milliamperes; for the curve 58, 65 milliamperes; and for the curve 59, 75 milliamperes. The foregoing data for air applies to the cell 13 of $3/8$ inch diameter, and with an ambient temperature between about 75° F. and 80° F.

Assuming now that the analyzer 10 is to have a range for the measurement of oxygen from 0 to 10%, then the mid-range point will be at 5% oxygen. The curve 48 of FIG. 2 is close to 5%, and thus it can be estimated that a curve for oxygen equal to 5% will for a pressure as indicated at X, indicate an output Y of about 0.25 millivolt. These values and the graph have been shown by the broken lines of FIG. 2. At the same pressure X in FIG. 4, the output Y will be the same as in FIG. 2 as read from the curve 55. In this manner, it is known that the current through the compensating resistor 17 should be made 45 milliamperes when the cell diameter is $3/8$" in order to compensate the bridge 28 when $O_2$ is about equal to 5%. This is readily done by selecting the proper value for the resistors 31 and 32 to achieve the desired current flow of said 45 milliamperes through the compensating side of the bridge including resistors 17 and 18.

With the foregoing determination of the current through resistor 17, it will be seen that the compensating cell 13 will exactly compensate and therefore eliminate in the output from the bridge 28 any component due solely to changing pressures in the measuring cell 11 when it contains 5% oxygen. Stated differently, the output voltages indicated by curve 55 (FIG. 4) and the estimated curve for 5% oxygen (FIG. 2) will be substantially the same and thus compensation due to change in pressure will be, to a close approximation, adequate to provide high precision in the measurement of the paramagnetic component in the sample stream, notwithstanding relatively wide changes in ambient pressure. The point X on the graphs will be selected as approximating the maximum pressure which may be anticipated. The curves are employed to select a current and cell diameter to achieve maximum precision about midway of the instrument scale. Hence for an analyzer for 0 to 5% oxygen it will be seen from FIG. 2 that compensation will be required to offset a bridge output of about 0.125 millivolt at a pressure of 20 inches of water. This can be achieved by limiting the current through the compensating cell resistor 18 to about 40 milliamperes, (see FIG. 4).

Referring now to FIG. 5, it will be seen that with bridge output plotted as ordinates and pressure changes again as abscissae, the graphs 61, 62, 63 and 64 bear a strong similarity to the curves of FIG. 4. More particularly, for a diameter of the compensating cell 13 of 7/32 inch, it will be seen that with other parameters constant there will be practically no change in the output of the bridge with change in pressure. However, with the diameter of cell 13 increased to 1/4 inch; then to 5/16 inch; and then to 3/8 inch, the output of the bridge will change in accordance with the curves 62, 63 and 64 respectively corresponding with said changed diameters. From what has already been said, it will be known at once that compensation to prevent change in output of the bridge in accordance with the curve 55 of FIG. 4 may be achieved without reducing the current through resistor 17 but instead utilizing a diameter for the reference cell 13 somewhat less than 1/4 inch to provide a matching curve for curve 55 of FIG. 4. If the correcting curve like curve 62 of FIG. 5 be utilized instead of the curve 55 of FIG. 4, there will be a like compensation without reduction of the current in the compensating branch of the bridge and the output of the bridge due to change in paramagnetic content will be relatively independent of the pressure changes. The degree of precision desired is readily attainable by utilizing the teachings of the present invention as set forth.

Summarizing, with plain convection type conductivity cells, the extent of convection cooling is a function of ambient temperature, cell diameter, current through the temperature-sensitive resistor, and the pressure of gas within the cell. In a bridge network with one of four identical convection type conductivity cells disposed in a magnetic field, but containing no paramagnetic gas, the extent of convection cooling will be unaffected by the magnetic field. In all of the cells, convection cooling will vary with ambient temperature, cell diameter, current through the resistor, and gas pressure to the same extent so that balance of the bridge will not be disturbed. However, if a paramagnetic gas be present in the sample stream, then the extent of magnetic-convection cooling will be additionally influenced not only by the concentration of paramagnetic gas in the measuring cell but by the pressure. These facts were explained in connection with the curves of FIG. 2. As has been shown, by the proper selection of parameters, a convection type cell in another arm of the bridge can be made to compensate for bridge network to maintain its output independent of pressure for any specific paramagnetic gas content of the measuring cell and nearly so over a satisfactory measuring range.

Figure 6:
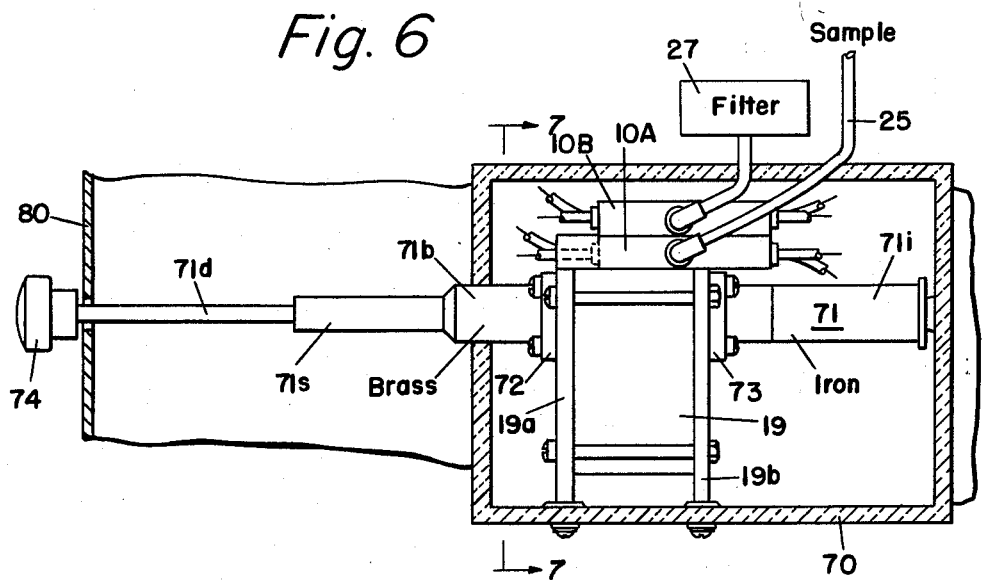
FIG. 6 is a side view, partly in section, of a preferred form of the invention.
Figure 7:
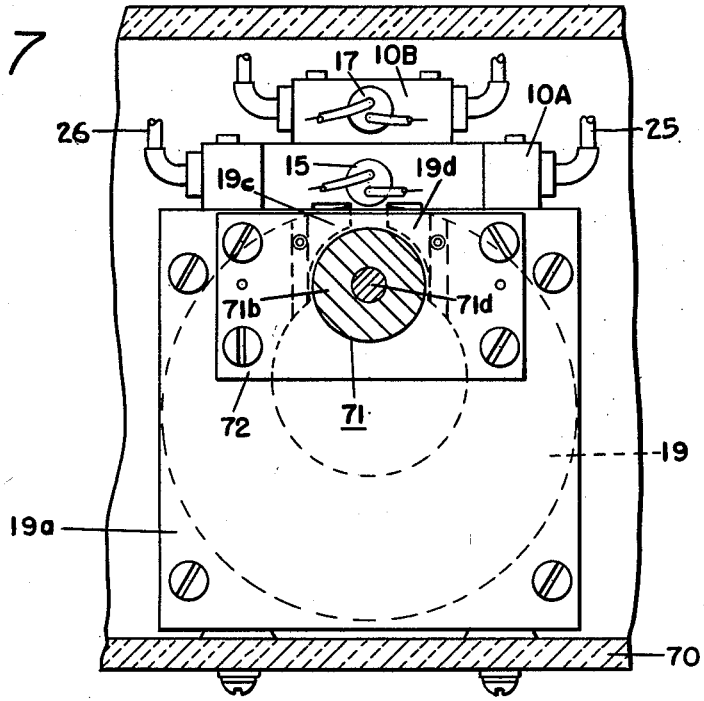
FIG. 7 is a sectional view taken on the line 7—7 of FIG. 6.

Referring now to FIGS. 6, 7, and 10, where like reference characters identify the same parts as in FIG. 1, there has been illustrated a preferred embodiment of the invention in which the cell and magnet assembly are enclosed within a housing 70 which preferably has associated with it temperature-controlling means such as a heating resistor and thermostats (not shown) in order to maintain constant the temperature within the enclosure 70. The magnet 19, which may be an electromagnet if desired, has been illustrated as a permanent, horseshoe-shaped, magnet supported between a pair of clamping plates 19a and 19b respectively secured to the bottom wall of the housing 70 as by fastening screws.

The magnet 19 has pole structure which defines a circular opening disposed just below the upper pole pieces 19c and 19d. Extending through the circular opening is a flux-diverting member 71, one elongated portion 71i thereof being of iron and another elongated portion thereof 71b being of brass. The flux-diverting member 71 is slidably supported in circular openings provided in the clamping plates 19a and 19b, and particularly by the bearing plates 72 and 73.

The housing structure 10A forming the cells 11 and 12 of FIG. 1 is secured to the supporting structure by the clamping plates 19a and 19b as by fastening screws shown in FIG. 7. The structure 10B forming the cells 13 and 14 is secured by suitable fastening screws shown in FIG. 7 to the structure 10A.

The exploded view of FIG. 10, partly in section, nicely illustrates the manner in which the cells 11–14 have been formed in the structure of blocks 10A and 10B together with the openings therein for the sample line 25 and the flow connection to the filter 27. As before described, the measuring cell 11 and the first reference cell 12 may be disposed at opposite ends of a cylindrical chamber of uniform cross section of say three-eighths of an inch in diameter. The compensating cell 13 may also be three-eighths of an inch in diameter, formed of a cylindrical cavity and the second reference cell 14 may be coaxial with the compensating cell 13, but of lesser diameter. Each of the four cells 11–14 is vented to atmosphere. FIG. 10 also illustrates a preferred construction of each of the temperature sensitive resistors 15–18. It will be observed that each is wound on a glass rod such as the rod 15a with one end of the spiral extending through the glass rod 15a and the other end of the spiral wire extending through a plug-in element 15p. These two conductors are then joined to the lead lines illustrated in FIGS. 1 and 1A to form the Wheatstone bridge. It is to be noted that each of the plug-in temperature-sensitive elements is provided with an O-ring, as for example the O-ring 15o which forms a gas-tight seal with the wall of its associated chamber, as for example, the wall of the chamber of cell 11. The plug-in assemblies are advantageous since providing for ease of inspection, as well as replacement.

The flux-diverting member 71 has been illustrated with its elongated brass portion 71b disposed between the pole structure of the magnet 19. Accordingly, it has no effect upon the magnetic field produced between them and particularly the magnetic field which is effective at least throughout a substantial peripheral portion of the cell 11. Thus the magnetic field or flux within cell 11 gives rise to the magnetic convection currents described above.

When it is desired to calibrate the instrument, two measuring points will be utilized. The zero point for the analyzer is attained by moving the flux-diverting element as by a knob 74 to move the iron or magnetizable portion 71i between the pole structure of the magnet 19. When in this position the flux of the magnet 19 will traverse the iron portion of the diverter 71i and thus for all practical purposes removes entirely the magnetic field from the cell 11. Accordingly gases within cell 11 will no longer have convection currents of magnitude related to their paramagnetic properties but instead, these convection currents will be the same for the measuring cell 11 and the reference cell 12, thus providing the desired zero output (at least to a close approximation) for the bridge 28, FIG. 1A.

With the flux-diverting member 71 in the above-described position, if the output of bridge 28 be not zero, then the movable contact of the potentiometer 40 will be adjusted to bring to zero the indication of an instrument 75. This adjustment of one or both potentiometers 39 and 40 is for the purpose of bringing the output of the bridge 28 to zero with the flux diverted from the measuring cell 11. By reason of the fact that the diameter of cell 13 will be greater than that of cell 14, with flux absent from the cells 11 and 12, the bridge 28 would be unbalanced were it not for the described adjustments of one or both of potentiometers 39 and 40. When they have been brought to positions which produce on the meter 75 readings corresponding with zero flux through the measuring cell 11, the bridge will be in part calibrated for measuring oxygen concentration of a sample gas for the measuring cell 11. The potentiometer 40 is for fine adjustments while the potentiometer 39 is for coarse adjustments, the difference between the two being a matter of differing values of resistance, the potentiometer 40 being of a much lower order.

It has been found convenient to utilize air for the second check point since the amount of oxygen in air is relatively constant and as already indicated, closely approximates 20.9%. Since the gas analyzer may frequently be used for concentrations of paramagnetic gases of a much lower order than 20.9%, it is necessary to provide a calibrating circuit for checking the response of the analyzer with atmospheric air.

Figure 1A:
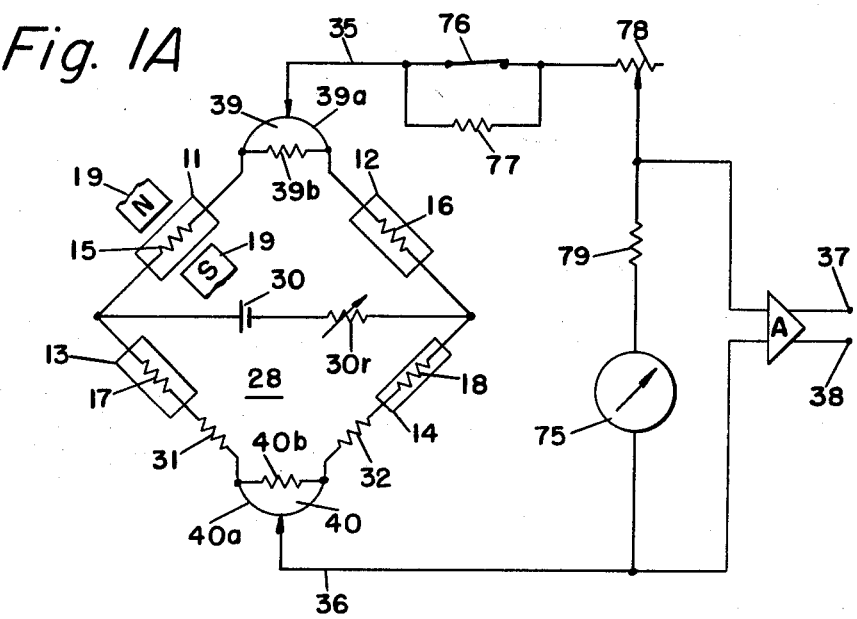

Referring to FIG. 1A, a switch 76 is opened to include in the output circuit, including conductor 35, a resistor 77 which is then in series with resistors 78 and 79 and the indicating instrument 75. This will predetermine a current value which if the bridge 28 be in adjustment will cause the instrument 75 to come to a predetermined point on the scale which may be marked 20.9. If the indicating instrument 75 does not indicate a reading of 20.9%, then the movable contact of resistor 78 will be adjusted to bring the reading of instrument 75 to the desired reading of 20.9%. Since this calibrating measurement comes about by the paramagnetic measurement of the concentration of oxygen in air, it will be understood that the flux diverting member 71 is in its illustrated position, FIGS. 6 and 10.

In some applications a recording instrument will be connected to the output terminals 37 and 38 and the described standardizing operation will similarly bring the recorder into correct adjustment; in fact, it alone can be utilized for the standardizing operation. As shown in FIG. 1A, an amplifier has been included in the output circuit leading to terminals 37 and 38. Such an amplifier will be ordinarily provided when the range of measurements is of the order of about 1% and less.

Though the flux-diverting member 71 has been described as made up of two sections of brass and iron, it is to be understood that any magnetizable and non-magnetizable materials may be utilized. For example, the non-magnetic part 71b need not be metallic. It could be made of Bakelite or other heat-insulating material. Where brass or other non-magnetic metal is utilized, as for example aluminum, it will be desirable to include a length of heat-insulating material for a substantial portion of the flux-diverter 71. Thus the elongated section 71s of diverter 71 is made of heat-insulating material, as for example Bakelite. The operating rod 71d may be of metal and, of course, can extend through an opening provided in a front panel 80, only a portion of which is shown in FIG. 6, but which may have a length and breadth adequate for the support of the measuring instruments, control valves, the air filter, and the like.

Though not specifically mentioned above, the mounting plates and bearing plates as well as structures 10A and 10B will be made of non-magnetic materials. Stainless steel of the Series 300 has sufficiently low magnetic properties to make it a suitable material. The bearing structures 72 and 73 center the diverter 71 within the circular opening of the magnet 19. The dimensions provide a slight clearance (less than about 0.005 of an inch) between it and the pole pieces 19c and 19d.

The dimensioning of the pole structure of the magnet 19, while not critical, does play an important part in the operation of the analyzer. As shown more particularly in FIG. 8, with a gap of about 5/16" between the opposing, spaced faces of the pole structure and with a measuring cell diameter of 3/8", there will be achieved maximum sensitivity for the instrument with the spacing $h$ of FIG. 8 from the upper surface of the pole structure to the horizontal center line of the measuring cell 11 from about 1/8" to about 5/32". The criticality of the foregoing spacing is illustrated by the graph of FIG. 9 where there has been plotted as ordinates the thermomagnetic sensitivity in millivolts against the spacing $h$ in inches. The resultant curve 81 illustrates a rapid increase in sensitivity until attainment of region 81a of maximum sensitivity above referred to. Thereafter, as "$h$" is increased, the sensitivity decreases.

It is to be understood that the curve 81 is exemplary of graphs which may be obtained though each may differ for each structure of differing design. For each such structure, there will be a region of maximum sensitivity obtained by selection of the distance "$h$" in the above-described manner. In general, the measuring cell 11 will also have a position such that lines drawn from the longitudinal axis of cell 11 to the respective pole tips will approximate an angle of 90°.

Figure 8:
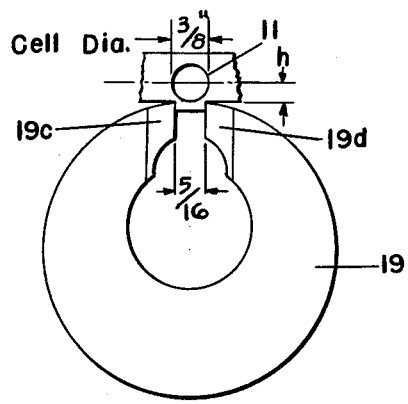
FIG. 8 is an end view of the permanent magnet with its associated pole structure and further illustrates the disposition of the measuring cell relative to said pole structure.
Figure 9:
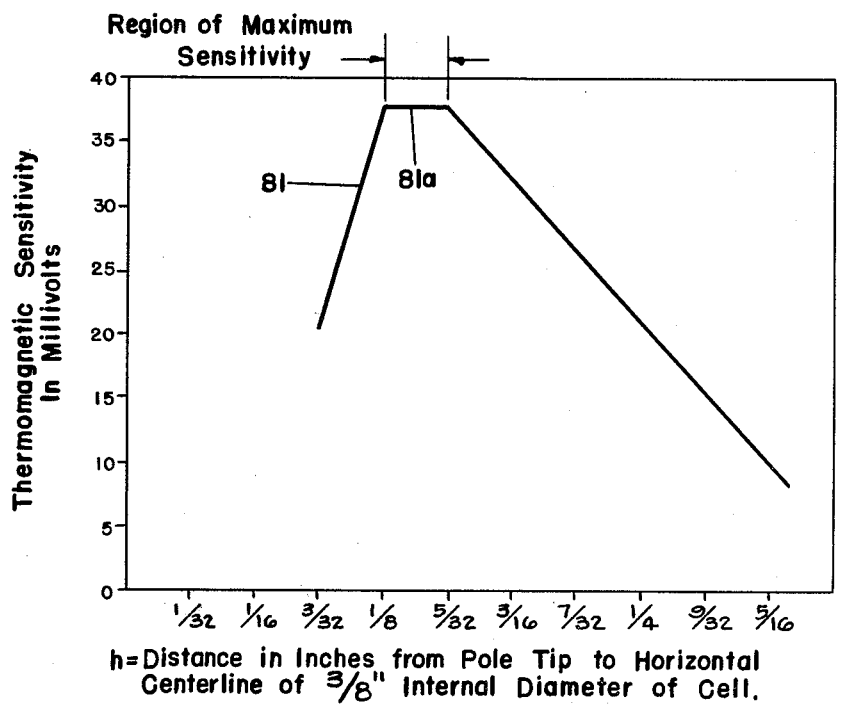
FIG. 9 is a graph of assistance in explaining the reasons for the disposition of the parts as appearing in FIGS. 7–8.

In order to achieve the distance "$h$," it will be observed from FIGS. 8 and 10 that the structure 10A is provided with channels 82 and 83 adapted to received the opposing pole structure of magnet 19, thus to bring the upper opposed edges of the pole pieces 19c and 19d within the region of maximum sensitivity as shown by FIG. 9.

With the above understanding of the invention it is to be understood that many modifications may be made within the scope of the appended claims. For example, it is not necessary that temperature-sensitive resistors be utilized. It is only necessary that temperature-sensitive elements be included in each of the respective cells 11—14, such for example as thermistors. Another alternative comprises heating elements and thermocouples each mounted to respond to the temperature of a heating element. The thermocouples are connected in the Wheatstone bridge as the sensitive elements with the cooling of the heating element taking place as above described.

Though not limited thereto but as exemplary of a typical embodiment of the invention, the temperature sensitive resistors 15–18 were made of platinum and each had resistance values of about 30 ohms at room temperature. The resistors 31 and 32 had values of approximately 40 ohms each. The potentiometer 39 had an effective resistance of about 5 ohms while the potentiometer 40 had an effective resistance of about three-tenths of an ohm. The battery 30 had a value of approximately 10 volts while the series rheostat 30r had a maximum value of about twenty ohms to provide 9 volts across the bridge 28. The permanent magnet 19 provided a magnetic flux of about 5000 gauss within the air gap of about 5/16". The resistors 77, 78 and 79 (the latter including the resistance of instrument 75) will have values to accommodate the sensitivities of the indicating and recording instruments.

What is claimed is:

1. A measuring cell for a gas analyzer of the paramagnetic type comprising a temperature-sensitive element, walls forming an enclosure for said element, a permanent magnet having pole structure for producing in a region adjacent said element a relatively strong magnetic field, flux diverting means for said magnet comprising a slidable member one portion of which is of high permeability material and the second portion of which is a non-magnetic material, said magnet having in the region of its pole structure a configuration complementary to that of said slidable member, and means for actuating said slidable member from a position in which said high permeability material diverts from said measuring cell said magnetic field to a position in which said magnetic field is reestablished in said measuring cell by the movement away from said pole pieces of said high permeability material.

2. The measuring cell of claim 1 in which said walls forming said enclosure for said element include means for predetermining the position of the enclosure of said element relative to said pole structure for production of maximum sensitivity of said element to the presence of paramagnetic gas.

3. The measuring cell of claim 1 in which said flux diverting member is circular in cross-section with said high permeability material forming a substantial length of said member and said non-magnetic material forming another substantial length of said member.

4. In a gas analyzer for paramagnetic gases of the type including
   a thermal conductivity measuring cell,
   a first thermal conductivity reference cell,
   each of said cells including therein a temperature-responsive element connected in adjacent arms of a Wheatstone bridge,
   each of said cells having the same unobstructed gas space about its said element,
   said cells being in communication to receive a sample of a paramagnetic gas, which changes in pressure in response to changes in ambient pressure,
   said measuring cell being disposed in a magnetic field, the improvement comprising
   compensating means for rendering the output of said bridge independent of the effect of changes in ambient pressure upon a paramagnetic gas in said measuring cell including
   a thermal conductivity compensating cell exposed to said ambient pressure changes and including a temperature-responsive element in a third arm of said bridge adjacent the arm including said measuring cell and having an unobstructed gas space about said last-named element for development of thermal convection currents which change in magnitude with change in ambient pressure upon said compensating cell,
   a second reference cell exposed to said ambient pressure changes and including a temperature-responsive resistor in the fourth arm of said bridge having a free space of volume materially less than that of said compensating cell, and
   resistors in said third and fourth arms of said bridge for decreasing the current through said elements in said third and fourth arms of said bridge to a value which for said gas space about said elements in said third and fourth arms of said bridge modifies the output of said bridge to compensate for the effect on the output of said bridge of a changing ambient pressure on said measuring cell.

5. In a gas analyzer for paramagnetic gases of the type including
   a Wheatstone bridge having four arms,
   a thermal conductivity measuring cell including a temperature-responsive element connected in one arm of said bridge,
   a first thermal conductivity reference cell having a temperature-responsive element connected in an arm of said bridge adjacent to said first mentioned arm,
   both of said cells having inlet means and outlet means for supply to said cells of a sample of a paramagnetic gas and through which changes in ambient pressure produce like changes of gas pressure within said cells,
   means for applying to said measuring cell in the region of its temperature-responsive element a magnetic field of high intensity,
   each of said cells having the same unobstructed gas space about its said element for developing an output from said bridge proportional to the concentration of paramagnetic gases in said measuring cell which output varies with said changes in said ambient pressure,
   the improvement comprising,
   compensating means for rendering the output of said bridge independent of the effect of said changes in said ambient pressure including,
   a thermal conductivity compensating cell having a temperature-responsive element in a third arm of said bridge adjacent the arm including said measuring cell and having a passage through which changes in said ambient pressure produce like changes in pressure within said compensating cell,
   said compensating cell having an unobstructed gas space about its said element for development of thermal convection currents which change in magnitude with said changes in said ambient pressure, and
   a second reference cell including a temperature-responsive element in the fourth arm of said bridge,
   said second reference cell having a structure for preventing change of thermal convection currents therein with changes in said ambient pressure.

6. The gas analyzer of claim 5 in which each of said four cells is in communication with the atmosphere for application to each of said cells of ambient changes in atmospheric pressure, said second reference cell having about its temperature-sensitive element a free gas space of volume inadequate for development of thermal convection currents of consequential magnitude.

7. The gas analyzer of claim 5 in which resistors are included in said third and fourth arms of said bridge for decreasing the current through said elements in said third and fourth arms of said bridge to a value which for said gas space about said element in said compensating cell modifies the output of said bridge to compensate for the effect on the output of said bridge of a changing pressure on said measuring cell.

8. The gas analyzer of claim 5 in which said measuring cell and said first reference cell are disposed at opposite end-portions of a first chamber of substantial length,
   flow connections disposed intermediate said first chamber for admission to and removing from said measuring cell and said first reference cell said sample,
   said compensating cell and said second reference cell being disposed at opposite end-portions of a second chamber of substantial length, and
   a passage disposed intermediate said second chamber for admission to said compensating cell and to said second reference cell of air.

9. The gas analyzer of claim 5 in which a first cell block comprises wall structure forming a pair of like opposed cylindrical chambers one forming said measuring cell and the other said first compensating cell,
   flow connections disposed midway of said cell block and forming said inlet and said outlet,
   a second cell block having opposed cylindrical chambers of differing diameter, the one of larger diameter comprising said compensating cell and the other of lesser diameter comprising said second reference cell, and
   a flow connection midway of said second cell block in communication midway of its said cells for application to the gases therein of changes in said ambient pressure.

10. The gas analyzer of claim 5 in which said means for applying to said measuring cell said magnetic field of high intensity comprises
    a permanent magnet having spaced pole structures abutting against wall structure of said measuring cell and in which the thickness of said wall structure predetermines the position of said sensitive element of said measuring cell relative to said spaced pole structures for development of maximum sensitivity of said measuring cell to the presence of said paramagnetic gases.

11. The gas analyzer of claim 5 in which said Wheatstone bridge is provided with at least one potentiometer connected between two arms of the bridge and having a contact connected in the output circuit of said bridge,
    a stationary magnet having pole structure adjacent said measuring cell for producing said magnetic field therethrough,
    a high permeability structure movable with respect to said pole structure of said magnet into field-shorting relation therewith for diverting substantially all of the magnetic field from said measuring cell, means for moving said high permeability structure with respect to said magnet into and out of said shorting relationship, said compensating cell providing pressure compensation in said Wheatstone bridge network for all positions of said high permeability structure, and means for relatively adjusting said contact and said potentiometer to zero the output of said bridge with said high permeability structure in said shorting relationship with said pole structure.

12. The gas analyzer of claim 10 in which said permanent magnet has in close proximity with said pole structures an elongated slidable flux-diverting member a first portion of which is of non-magnetic material and a second portion displaced lengthwise from said first portion is of high permeability material, and means for moving said flux-diverting member alternately to bring said non-magnetic material and said high permeability material directly between said pole structures, said high permeability material when between said pole structures diverting from said measuring cell the magnetic field produced by said magnet without changing the position of said magnet in its position in abutting relationship against the wall structure of said measuring cell.

13. The gas analyzer of claim 12 in which said bridge is provided with means for adjusting to zero the output of said bridge when said high permeability material has diverted said magnetic field from said measuring cell to eliminate effects on said bridge output of paramagnetic gases in said measuring cell.

14. The gas analyzer of claim 12 in which both said portions of said flux-diverting member are circular in cross section and in which said pole structure is provided with a circular opening in which said flux-diverting member is slidable selectively to bring into the region of said pole pieces said portions of non-magnetic material and of said high permeability material.

References Cited by the Examiner
UNITED STATES PATENTS

| | | | |
|---|---|---|---|
| 2,603,964 | 7/52 | Foley et al. | 73—27.5 |
| 2,603,965 | 7/52 | Medlock | 73—27.5 |
| 2,658,384 | 11/53 | Richardson | 73—27.5 |
| 2,763,151 | 9/56 | Richardson | 73—27.5 |
| 2,815,659 | 12/57 | Krupp | 73—27.5 |
| 2,951,359 | 9/60 | Krupp | 73—1 |

RICHARD C. QUEISSER, *Primary Examiner.*

ROBERT L. EVANS, *Examiner.*